(12) United States Patent
Secatch et al.

(10) Patent No.: US 11,017,098 B2
(45) Date of Patent: May 25, 2021

(54) COLLECTION OF UNCORRELATED ENTROPY DURING A POWER DOWN SEQUENCE

(71) Applicant: Seagate Technology LLC, Cupertino, CA (US)

(72) Inventors: Stacey Secatch, Niwot, CO (US); Steven S. Williams, Longmont, CO (US); David W. Claude, Loveland, CO (US); Benjamin J. Scott, Longmont, CO (US); Kyumsung Lee, Louisville, CO (US); Stephen H. Perlmutter, Louisville, CO (US)

(73) Assignee: Seagate Technology LLC, Fremont, CA (US)

( * ) Notice: Subject to any disclaimer, the term of this patent is extended or adjusted under 35 U.S.C. 154(b) by 343 days.

(21) Appl. No.: 16/021,823

(22) Filed: Jun. 28, 2018

(65) Prior Publication Data

US 2020/0004971 A1    Jan. 2, 2020

(51) Int. Cl.
| | | |
|---|---|---|
| *G06F 21/00* | (2013.01) |
| *G06F 21/60* | (2013.01) |
| *H04L 9/08* | (2006.01) |
| *G06F 1/28* | (2006.01) |
| *G06F 3/06* | (2006.01) |
| *G06F 11/10* | (2006.01) |

(52) U.S. Cl.
CPC ............ *G06F 21/602* (2013.01); *G06F 1/28* (2013.01); *G06F 3/0623* (2013.01); *G06F 3/0656* (2013.01); *G06F 3/0679* (2013.01); *G06F 11/1096* (2013.01); *H04L 9/0869* (2013.01)

(58) Field of Classification Search
CPC .......... G06F 12/0246; G06F 2212/205; G06F 13/1668; G06F 13/1684; G06F 13/1694; G06F 1/30; G06F 1/28; G06F 21/602; G06F 3/0652; G06F 3/0656; G06F 11/1096; G06F 3/0679; H04L 9/0869
See application file for complete search history.

(56) References Cited

U.S. PATENT DOCUMENTS

| | | |
|---|---|---|
| 6,218,973 B1 | 4/2001 | Barrett, Jr. et al. |
| 6,687,772 B1 | 2/2004 | Eidson |
| 7,330,328 B2 | 2/2008 | Xie et al. |

(Continued)

*Primary Examiner* — Ghazal B Shehni
(74) *Attorney, Agent, or Firm* — Hall Estill Attorneys at Law

(57) ABSTRACT

Apparatus and method for managing entropy in a cryptographic processing system, such as but not limited to a solid-state drive (SSD). In some embodiments, a processing device is operated to transfer data between a host device and a non-volatile memory (NVM). In response to the detection of a power down event associated with the processing device, entropy associated with the power down event is collected and stored in a memory. Upon a subsequent reinitialization of the processing device, the entropy is conditioned and used as an input to a cryptographic function to subsequently transfer data between the host device and the NVM. In some embodiments, the entropy is obtained from the state of a hardware timer that provides a monotonically increasing count for timing control. In other embodiments, the entropy is obtained from a RAID buffer used to store data to a die set of the NVM.

18 Claims, 6 Drawing Sheets

(56) References Cited

U.S. PATENT DOCUMENTS

| | | |
|---|---|---|
| 9,037,624 B1 | 5/2015 | Hars et al. |
| 9,529,570 B2 | 12/2016 | Anderson et al. |
| 9,569,176 B2 | 2/2017 | Venkata et al. |
| 2010/0174766 A1 | 7/2010 | Weeks et al. |
| 2017/0046129 A1 | 2/2017 | Cambou |
| 2018/0189187 A1* | 7/2018 | Cheung ................ G06F 3/0679 |

* cited by examiner

COLLECTION OF UNCORRELATED ENTROPY DURING A POWER DOWN SEQUENCE

SUMMARY

Various embodiments of the present disclosure are generally directed to cryptographic processing systems, such as but not limited to a data storage environment.

In some embodiments, a processing device is operated to transfer data between a host device and a non-volatile memory (NVM). In response to the detection of a power down event associated with the processing device, entropy associated with the power down event is collected and stored in a memory. Upon a subsequent reinitialization of the processing device, the entropy is conditioned and used as an input to a cryptographic function to subsequently transfer data between the host device and the NVM. In some embodiments, the entropy is obtained from the state of a hardware timer that provides a monotonically increasing count for timing control. In other embodiments, the entropy is obtained from a RAID buffer used to store data to a die set of the NVM.

These and other features which characterize various embodiments of the present disclosure can be understood in view of the following detailed discussion and the accompanying drawings.

DETAILED DESCRIPTION

Figure 1:
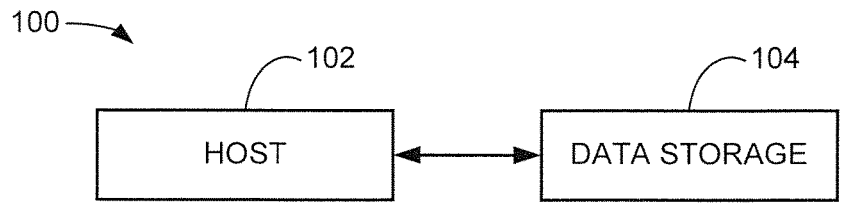
FIG. 1 is a functional block representation of a data processing system which operates in accordance with various embodiments of the present disclosure.

Data security schemes are used to reduce or eliminate access to data by unauthorized users of digital data processing systems. Data security schemes can employ a variety of cryptographic security techniques, such as data encryption and data security protocols.

Data encryption generally involves the transformation of an input data sequence plaintext) to an encrypted output data sequence (e.g., ciphertext) using a selected encryption algorithm (cipher). The cipher may utilize one or more pieces of auxiliary data keys, counter values, nonce values, etc.) to effect the transformation. In this context, plaintext can include data that have been previously encrypted by an upstream encryption process. The algorithm may be symmetric or asymmetric. A symmetric algorithm operates to return (decrypt) the originally input plaintext by applying the same algorithm and auxiliary data to the previously generated ciphertext.

Data security protocols deal with maintaining the security of data within a system, such as by establishing symmetric keys, carrying out secret sharing transactions, establishing and verifying connections, authenticating data, generating digital signatures and keyed message digest values, etc.

Cryptographic security techniques often use entropy as part of the cryptographic processing. Generally, the term "entropy" relates to the amount of information that is present in a set of data. In one formulation, entropy can be thought of as the minimum number of bits required to represent the informational content of a set of data of interest.

A low entropy value has an informational content that can be described using a single bit or just a few bits. An n-bit sequence of all logical 1s would generally have very low entropy, since all of the values of the sequence could be described by a single bit (e.g., a logical 1).

A high entropy value requires many bits to describe the informational content of the value. A true random number string would have entropy corresponding to the number of bits in the string, so an n-bit random string would generally have n bits of entropy. This is because every bit in the sequence would be completely random and independent of every other bit in the sequence. Few if any repeating patterns would appear in the sequence, so another way of defining a high entropy value is a value that is susceptible to little or no lossless data compression.

Increasing the amount of entropy in values used in a cryptographic function tends to increase the security of the function against attack. Using an encryption key with high entropy makes it more difficult to guess the key or determine the key using brute force methods; adding a random string as an input to a hash function makes it that much more difficult to replicate or discover the inputs, and so on.

It is common to utilize various mechanisms to generate entropy in a device for use by cryptographic functions of the device. Random number generators in the form of ring oscillators, timing circuits, motors, etc. can be used to generate values of high entropy. Other circuits and devices can be provided to generate low entropy values, such as the total number of pulses required to program semiconductor memory cells to certain values, the variations of parameters between different memory cells, etc. Low entropy values can be converted to high entropy values using well known extraction and certification techniques.

Traditional storage devices such as hard disc drives (HDDs) use a number of mechanical elements such as spindle motors and actuators that can provide good sources of high entropy. On the other hand, solid-state drives (SSDs) and other types of storage devices that use semiconductor memory do not tend to have moving parts, and thus present a challenge in identifying a sufficient number of non-correlated sources of entropy.

Various embodiments of the present disclosure are directed to an apparatus and method for enacting a cryptographic processing system in a processing device, such as but not limited to an SSD. As explained below, some embodiments provide the processing device with an entropy manager circuit that extracts and qualifies entropy values from one or more entropy sources during operation of the processing device. The source(s) may provide high entropy and/or low entropy. The conditioned entropy values are used as an input to a cryptographic function carried out by or in conjunction with the device.

In some embodiments, the entropy manager circuit collects and stores entropy related to an event or state that is not related to an ongoing process, such as during a shutdown sequence for the device. Where multiple independent processes are being executed, such as the arrangement of an SSD into different die sets having different owners, entropy associated with one die set may be used as an input into another die set. Further embodiments condition and, as desired, cryptographically secure the entropy for future use. The conditioned entropy may satisfy certain entropy constraints, including having at least a minimum acceptable level of entropy.

In some cases, hardware circuits in the form of timers provide monotonically increasing counters to provide timing control within the device. Because unplanned power loss to the device is typically an unexpected event not related to ongoing processing, lower bits in the various counts can be collected and used as low level entropy values. Other operations that occur as a result of an unplanned power loss can additionally or alternatively be used as sources of entropy during the power down (scram) event. Once the device is restored to a powered up state, the collected entropy can be retrieved and processed as required for use.

These and other features and advantages of various embodiments can be understood beginning with a review of FIG. 1 which shows a data processing system 100. The data processing system 100 includes a host device 102 operably coupled to a data storage device 104. This is merely illustrative as any number of different types of data processing environments can be used as desired, including environments that do not involve data storage systems.

The host device 102 and the data storage device 104 in FIG. 1 can each take a variety of forms. Without limitation, the host device 102 may take the form of a personal computer, workstation, server, laptop, portable handheld device, smart phone, tablet, gaming console, RAID controller, etc. The data storage device 104 may be a hard disc drive (HDD), solid-state drive (SSD), hybrid solid state drive (HSSD), thumb drive, optical drive, an integrated memory module, a multi-device storage enclosure, etc. The data storage device 104 may be incorporated into the host device as an internal component or may be an external component accessible via a communication pathway with the host device 102 including a cabling connection, a wireless connection, a network connection, etc.

For purposes of the present discussion, it will be contemplated that the host device 102 is a local or remote client computer and the data storage device 104 provides a main memory store for user data generated by the host device. The storage device includes a controller and a non-volatile memory (NVM).

Figure 2:
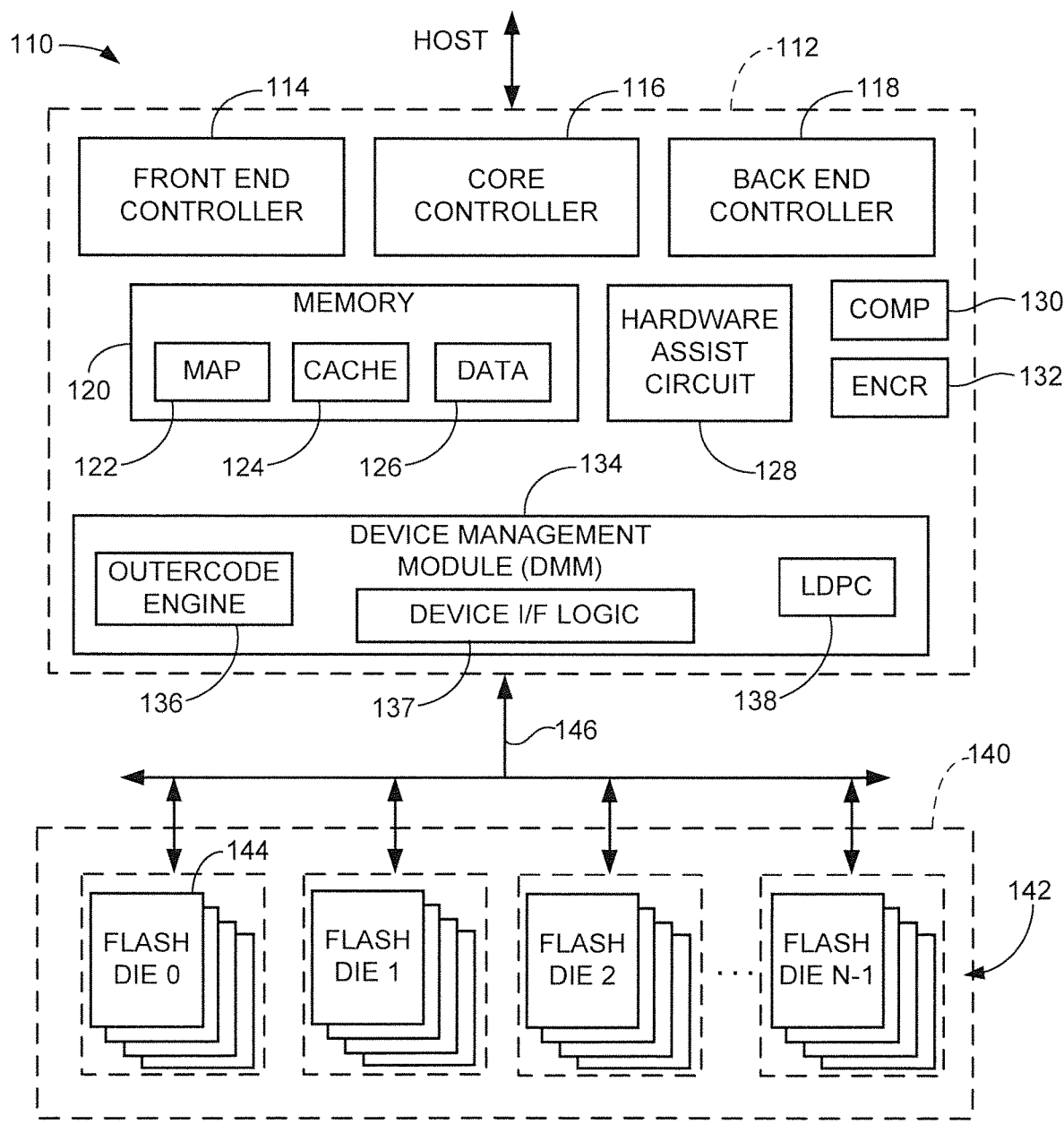
FIG. 2 shows a configuration of the data storage device of FIG. 1 in accordance with some embodiments.

FIG. 2 shows a data storage device 110 generally corresponding to the data storage device 104 from FIG. 1 in some embodiments. The device 110 is characterized as a solid-state drive (SSD) that communicates with one or more host devices such as 102 in FIG. 1 via one or more Peripheral Component Interface Express (PCIe) ports. The NVM is contemplated as comprising NAND flash memory, although other forms of solid state non-volatile memory can be used.

In at least some embodiments, the SSD operates in accordance with the NVMe (Non-Volatile Memory Express) specification, which enables different users to allocate NVM sets (die sets) for use in the storage of data. Each NVM set may form a portion of an NVMe namespace that may span multiple SSDs or be contained within a single SSD.

The SSD 110 includes a controller circuit 112 with a front end controller 114, a core controller 116 and a back end controller 118. The front end controller 114 performs host I/F functions, the back end controller 118 directs data transfers with the memory module 114 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can alternatively be used. The various controllers may be integrated into a single system on chip (SOC) integrated circuit device, or may be distributed among various discrete devices as required.

A controller memory 120 represents various forms of volatile and/or non-volatile memory (e.g., SRAM, DDR DRAM, flash, etc.) utilized as local memory by the controller 112. Various data structures and data sets may be stored by the memory including one or more map structures 122, one or more caches 124 for map data and other control information, and one or more data buffers 126 for the temporary storage of host (user) data during data transfers.

A non-processor based hardware assist circuit 128 may enable the offloading of certain memory management tasks by one or more of the controllers as required. The hardware circuit 128 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in hardware and/or firmware in the controller 112, such as a data compression block 130 and an encryption block 132. The data compression block 130 applies lossless data compression to input data sets during write operations, and subsequently provides data de-compression during read operations. The encryption block 132 provides any number of cryptographic functions to input data including encryption, hashes, decompression, etc.

A device management module (DMM) 134 supports back end processing operations and may include an outer code engine circuit 136 to generate outer code, a device I/F logic circuit 137 and a low density parity check (LDPC) circuit 138 configured to generate LDPC codes as part of the error detection and correction strategy used to protect the data stored by the by the SSD 110.

A memory module 140 corresponds to the memory 104 in FIG. 1 and includes a non-volatile memory (NVM) in the form of a flash memory 142 distributed across a plural number N of flash memory dies 144. Rudimentary flash memory control electronics (not separately shown in FIG. 2) may be provisioned on each die 144 to facilitate parallel data transfer operations via a number of channels (lanes) 146.

Figure 3:
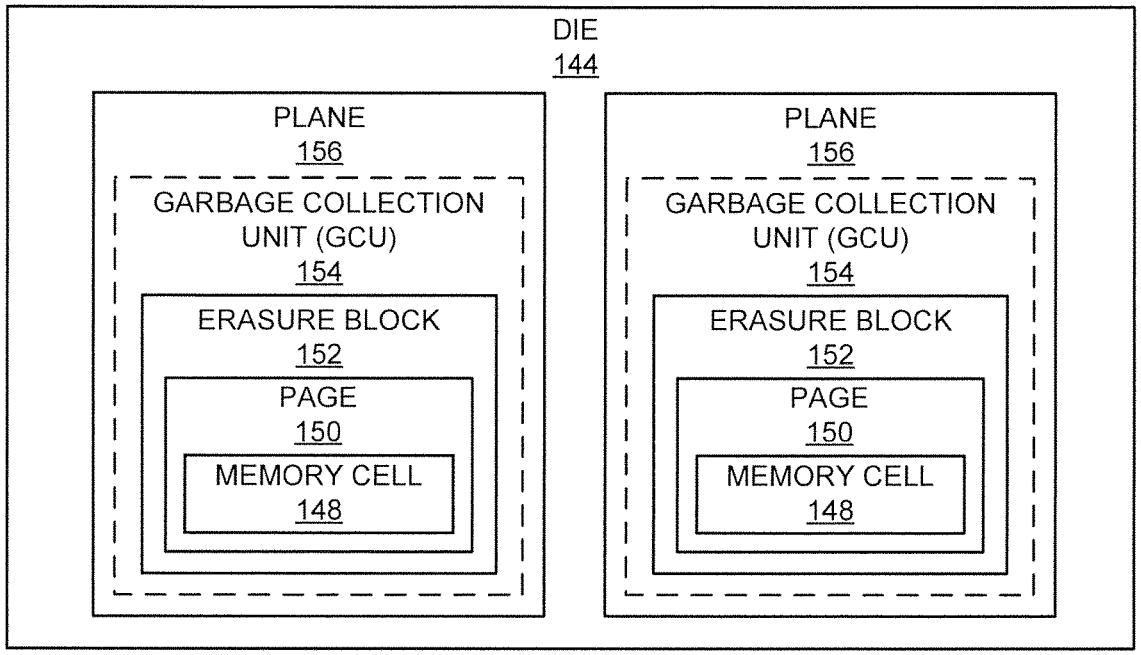
FIG. 3 depicts an arrangement of a selected flash semiconductor memory die from FIG. 2.

FIG. 3 shows an arrangement of the various flash memory dies 144 in the flash memory 142 of FIG. 2 in some embodiments. Each die 144 incorporates a large number of flash memory cells 148. The cells may be arrayed in a two-dimensional (2D) or three-dimensional (3D stacked) arrangement with various control lines (e.g., source, bit, word lines) to access the cells.

Groups of cells 148 are interconnected to a common word line to accommodate pages 150, which represent the smallest unit of data that can be accessed at a time. Depending on the storage scheme, multiple pages of data may be written to the same physical row of cells, such as in the case of MLCs (multi-level cells), TLCs (three-level cells), XLCs (four-level cells), and so on. Generally, n bits of data can be stored to a particular memory cell 148 using $2^n$ different charge states (e.g., TLCs use eight distinct charge levels to represent three bits of data, etc.). The storage size of a page can vary; current generation flash memory pages can store, in some cases, 16 KB (16,384 bytes) of user data.

The memory cells 148 associated with a number of pages are integrated into an erasure block 152, which represents the smallest grouping of memory cells that can be concurrently erased in a NAND flash memory. A number of erasure blocks 152 are turn incorporated into a garbage collection unit (GCU) 154, which utilizes erasure blocks across different dies as explained below. GCUs are allocated and erased as a unit.

During operation, a selected GCU is allocated for the storage of user data, and this continues until the GCU is filled. Once a sufficient amount of the stored data is determined to be stale (e.g., no longer the most current version), a garbage collection operation can be carried out to recycle the GCU. This includes identifying and relocating the current version data to a new location, followed by an erasure operation to reset the memory cells to an erased (unprogrammed) state. The recycled GCU is returned to an allocation pool for subsequent allocation to begin storing new user data. In one embodiment, each GCU 154 nominally uses a single erasure block 152 from each of a plurality of dies 144, such as 32 dies.

Each die 144 may further include a plurality of planes 156. Examples include two planes per die as shown in FIG. 3, although other numbers of planes per die, such as four planes per die, etc. can be used. Generally, a plane is a subdivision of the die 144 arranged with separate read/write/erase circuitry such that a given type of access operation (such as a write operation, etc.) can be carried out simultaneously by each of the planes to a common page address within the respective planes.

Figure 4:
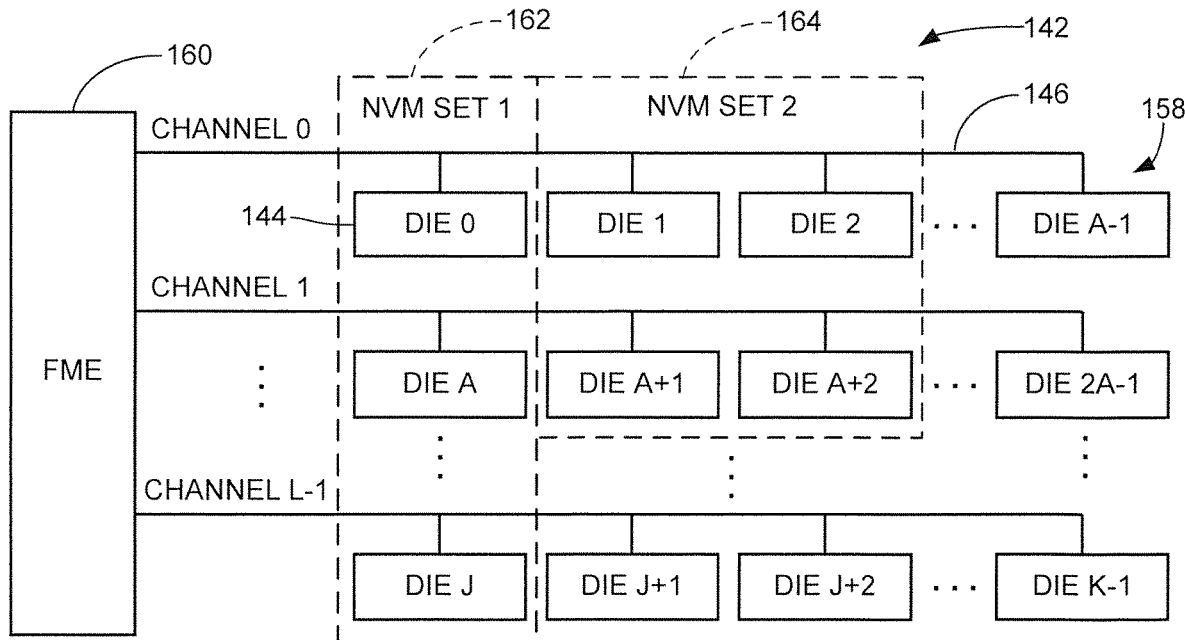
FIG. 4 shows the arrangement of the dies into various NVM sets in some embodiments.

FIG. 4 shows further aspects of the flash memory 142 in some embodiments. A total number K dies 144 are provided and arranged into physical die groups 158. Each die group 158 is connected to a separate channel 146 using a total number of L channels. A flash memory electronics (FME) circuit 160 of the flash memory module 142 controls each of the channels 146 to transfer data to and from the respective die groups 158. In one example, K is set to 128 dies, L is set to 8 channels, and each physical die group has 16 dies. In this way, any of the 16 dies connected to a given channel 146 can be accessed at a given time using the associated channel.

In some embodiments, the various dies are arranged into one or more NVM sets. An NVM set, also referred to a die set, represents a portion of the storage capacity of the SSD that is allocated for use by a particular host (user/owner). NVM sets are established with a granularity at the die level, so that each NVM set will encompass a selected number of the available dies 144.

A first example NVM set is denoted at 162 in FIG. 4. This first set 162 uses a single die 144 from each of the different channels 146. This arrangement provides fast performance during the servicing of data transfer commands for the set since all eight channels 146 are used to transfer the associated data to service a host access command. A limitation with this approach is that if the set 162 is being serviced, no other NVM sets can be serviced during that time interval. While the set 162 only uses a single die from each channel, the set could also be configured to use multiple dies from each channel, such as four (4) dies per channel for a total of 32 dies.

A second example NVM set is denoted at 164 in FIG. 4. This set uses dies 144 from less than all of the available channels 146. This arrangement provides relatively slower overall performance during data transfers as compared to the set 162, since for a given size of data transfer, the data will be transferred using fewer channels. However, this arrangement advantageously allows the SSD to service multiple NVM sets at the same time, provided the sets do not share the same (e.g., an overlapping) channel 146.

Without limitation, it is contemplated for the present discussion that the flash memory 142 is divided into four (4) equally sized NVM (die) sets, each having 32 of the available 128 dies 144 in the memory. These can be arranged to have dedicated channels as with the die set 164 or to use all of the channels as with the die set 162.

Figure 5:
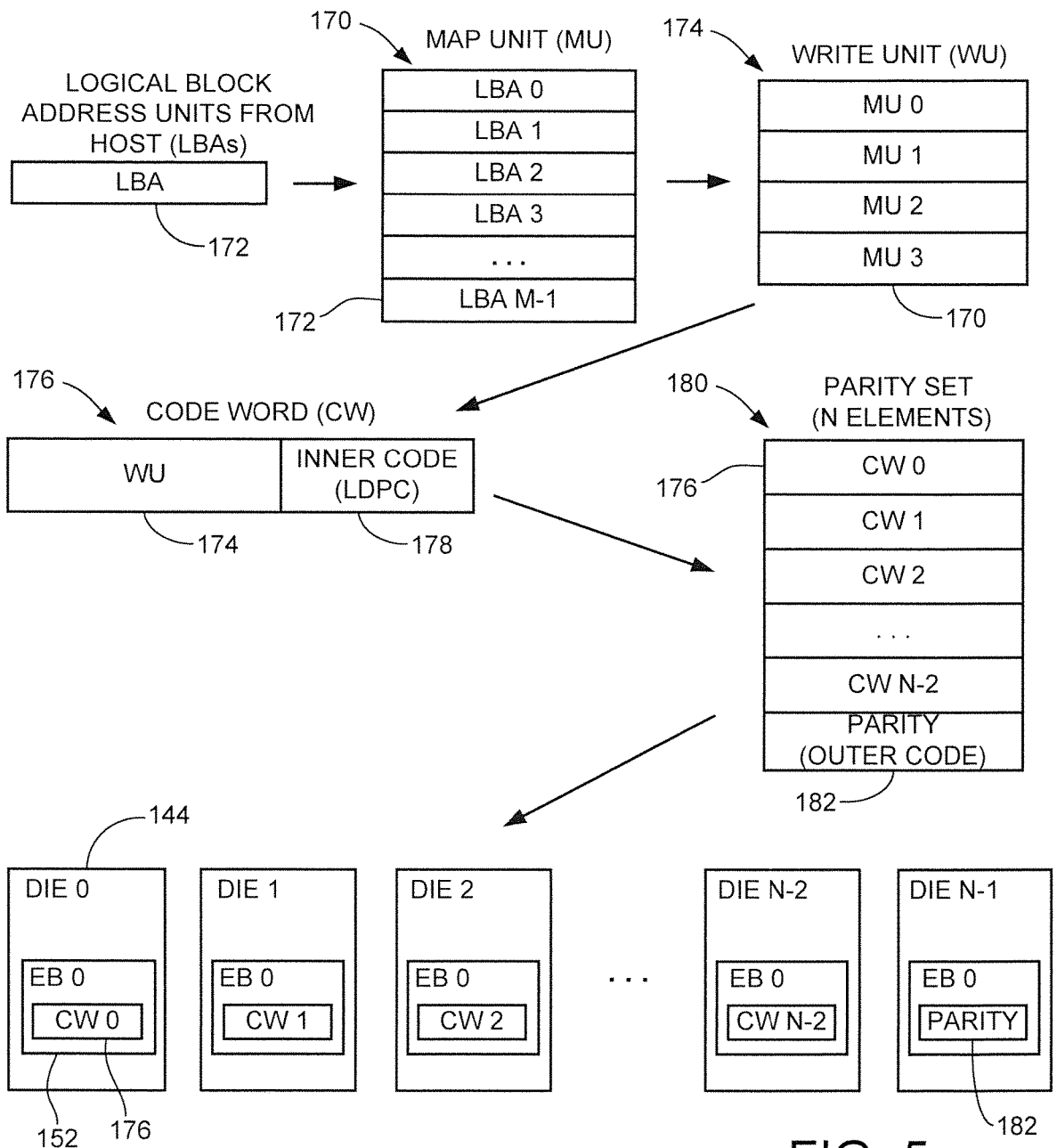
FIG. 5 illustrates a manner in which data may be stored to the various NVM sets in some embodiments.

FIG. 5 illustrates a manner in which user data are stored to the flash memory module 142 in accordance with some embodiments. Map units (MUs) 170 represent fixed sized blocks of data that are made up of one or more user logical block address units (LBAs) 172 supplied by the host. Without limitation, the LBAs 172 may have a first nominal size, such as 512 bytes (B), 1024 B (1 KB), etc., and the MUs 170 may have a second nominal size, such as 4096 B (4 KB), etc. The application of data compression may cause each MU to have a smaller size in terms of actual bits written to the flash memory 142.

As noted above, in one example each page 150 represents nominally 16 KB of user data capacity. Hence, each set of four (4) MUs 170 will be grouped together to form a write units (WU) 174 of nominally 16 KB of user data.

A code word (CW) 176 is formed by appending, to the WU 174, an inner code value 178. It is contemplated that the inner code constitutes low density parity check (LDPC) codes, although other error correction schemes can be used. The number of code bits will vary, but may be on the order of about 10 KB or so for 16 KB of user data, depending on the construction of the flash memory 142. As will be recognized, LDPC codes enable fast detection and correction of read errors during a read operation. The inner codes 178 may be generated by the LDPC module 138 (see FIG. 2) in preparation of writing the WU 174 to the flash memory.

Some number of code words 176 are grouped together to form a parity set 180 having N elements. Nominally, the value N will be based on the number of erasure blocks 152 in a given GCU 154, although this is not necessarily required. For the present example, it is contemplated that N=32 although other numbers of elements can be used. As shown in FIG. 5, the parity set 180 will have N−1 code words 176 (e.g., N−1=31) plus an appended parity value 182. Each of the various code words 176 and the associated parity value 182 are written as a different page of data in the GCU. More particularly, the code words and parity values for a given parity data set may be written to the same page and same designated erasure block (e.g., EB 0) across the respective dies, as shown.

The parity value 182 represents outer code and can take any number of forms. Without limitation, in one embodiment the parity value 182 represents the output of an exclusive-or (XOR) function applied to the N−1 code words 176.

Figure 6:
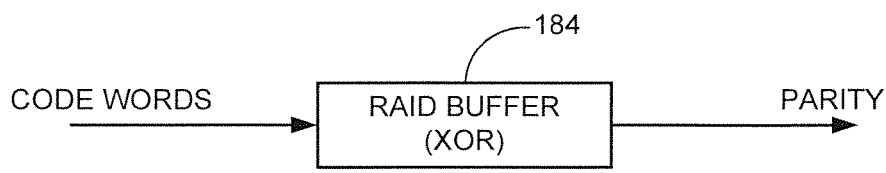
FIG. 6 depicts a RAID buffer used to generate parity data from FIG. 5.

FIG. 6 shows a RAID buffer 184 configured to receive and accumulate the 31 code words 176 in each parity set 180 to generate the parity value 182. In this way, the data from the parity set can be reconstructed even in the event of a single die failure. It follows that nominally 16 KB of parity data protects (16 KB)(31)=496 KB of user data in each parity set, for an overhead ratio of about 3.2%.

The parity sets stored by the SSD 110 are managed using metadata. The metadata provide map structures, such as the map data 122 in FIG. 2, to track the locations of various data blocks within the flash memory 142. During the servicing of a read command, it is generally necessary to locate the physical address within the flash memory 142 at which the most current version of a requested block (e.g., LBA) is stored, so that the controller can schedule and execute a read operation to return the requested data to the host.

During the servicing of a write command, new data are written to a new location, but it is still necessary to locate the previous data blocks sharing the same logical address as the newly written block so that the metadata can be updated to mark the previous version of the block as stale and to provide a forward pointer or other information to indicate the new location for the most current version of the data block. Map updates may be periodically written to the flash memory in the form of map parity sets arranged in a manner similar to that set forth by FIG. 5. It is contemplated albeit not necessarily required that each die set will have a corresponding set controller that independently generates and implements threads to store user data parity sets and manage the corresponding map data for the associated die set.

Figure 7:
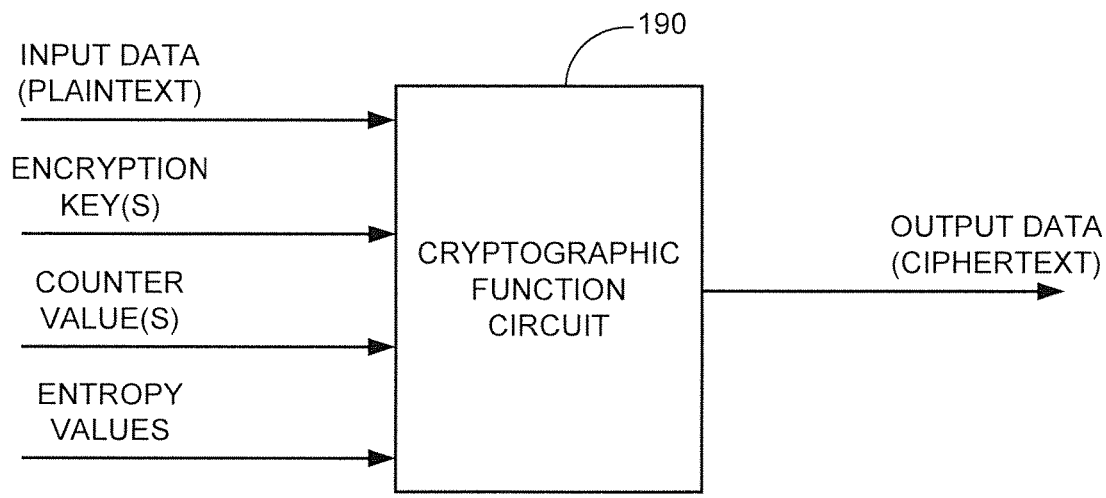
FIG. 7 depicts a cryptographic function circuit used by the data storage device during various operations including the storage of data in FIG. 5.

FIG. 7 shows a cryptographic function circuit 190 of the SSD 110 in some embodiments. The circuit 190 generally corresponds to the encryption circuit 134 in FIG. 2 and may be realized in hardware and/or firmware via a programmable processor.

Generally, the cryptographic function circuit 190 is arranged to perform one or more cryptographic functions upon various sets of input data (e.g., plaintext) to generate cryptographically processed output data (e.g., ciphertext). This operation can include the application of one or more levels of encryption to the user data and map data stored to the flash memory. Other data within the SSD can be encrypted or otherwise cryptographically secured, such as encryption keys and other control data stored in local memory.

The cryptographic function can include an encryption algorithm, a decryption algorithm, a hash function, etc. Various inputs of auxiliary data may be supplied as part of the algorithm including encryption keys, counter values, and entropy values. Such values may be supplied from a keystore or other locations within the device.

Figure 8:
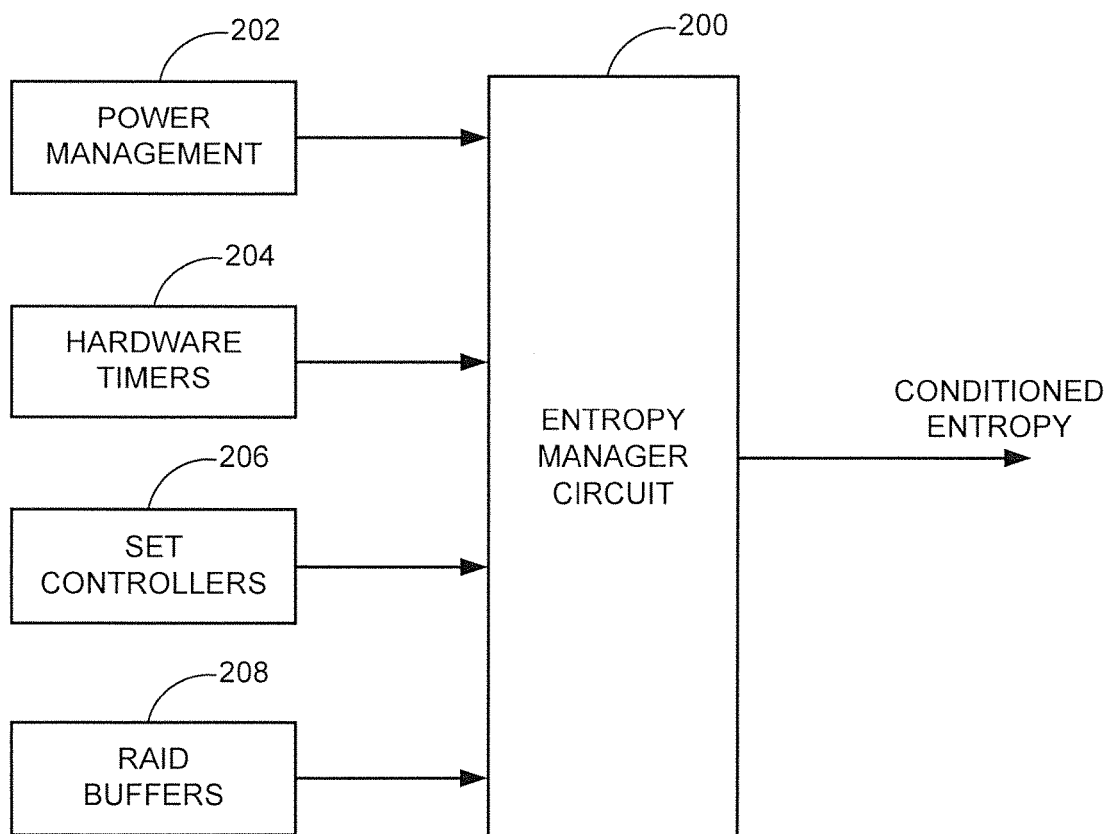
FIG. 8 shows an entropy manager circuit configured to collect and condition entropy for use by the circuitry of FIG. 7.

The entropy values are managed by an entropy manager circuit 200 as shown in FIG. 8. The entropy manager circuit 200 operates to collect and condition entropy from a variety of sources. Inputs to the entropy manager circuit 200 include a power management circuit 202, an array of hardware timers 204, set controllers 206 and RAID buffers 208. Other sources can be used as required.

The power management circuit 202 manages the application of power to the SSD 110. It is contemplated that one or more source voltages (such as nominally 3.3 Vdc, etc.) will be supplied to the SSD from an external source. The power management circuit will continuously monitor the power inputs and provide an indication when a level drops below an acceptable threshold, indicating an unplanned power loss event. A loss of supplied power can occur due to a number of factors such as transients on the power line, the physical unplugging or deactivation of the SSD by a user, a failure condition, etc.

The power management circuit 202 includes a local power source in the form of a capacitor, a battery, etc. to supply temporary power to enable the SSD 110 to enter a power down (scram) period of operation in response to a detected power loss event. During the scram event, the SSD 110 will perform various operations to save existing data and control values to NVM before the temporary power is exhausted. Part of the scram processing may include the collection and storage of entropy for future use by the SSD.

The hardware timers 204 provide monotonically increasing counts at some nominally frequency. The counts are used for timing control including the generation of clock signals, time stamps, etc. during the processing of the individual threads. The set controllers 206 may represent separate physical and/or functional controller operational capabilities to independently control the transfer of data with the respective die sets.

The RAID buffers 208 generally correspond to the RAID buffer 184 in FIG. 6 and are used to generate parity values and other control data used by the set controllers 206. In some cases, the buffers 208 may be shared resources such that the controller 112 uses a mechanism to arbitrate the shared use of these elements among the various set controllers.

Figure 9:
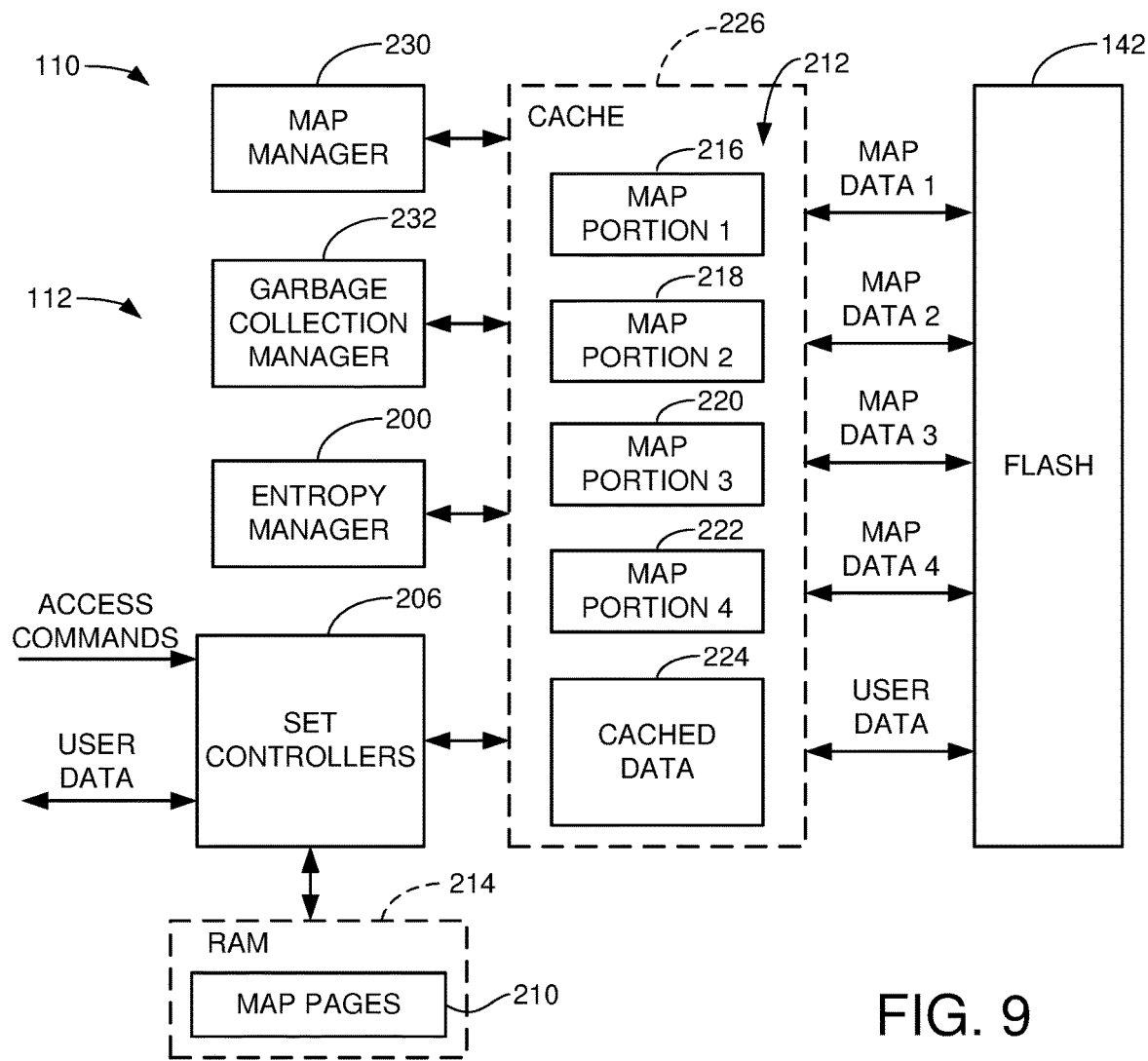
FIG. 9 is an arrangement of the SSD of FIG. 2 in greater detail in accordance with some embodiments.

FIG. 9 shows the SSD 110 in greater detail. The map data 122 (FIG. 2) may be arranged as a forward map that includes a first level map 210 and a second level map 212. The first level map 210 may be loaded in local SRAM 214 for fast access by the set controllers 206. The first level map 210 provides map pages to identify, for a given range of logical addresses, the entries in the second level map 212.

The second level map 212 may be divided into multiple (in this case, four) portions 216, 218, 220 and 222 corresponding to four (4) die sets for four independent host devices. The second level map provides a flash transition layer (FTL) to correlate logical-to-physical addresses in the flash. The second level map portions 216, 218, 220 and 222, as well as temporarily cached user data 224, may be stored in a local cache memory 226 which may take the form of DDR DRAM.

The controller 112 from FIG. 2 is shown in FIG. 9 to include the aforementioned entropy manager circuit 200, the various set controllers 206, as well as a map manager circuit 230 and a garbage collection manager circuit 232. The map manager controls updates to the map data, and the garbage collection manager performs garbage collection operations to relocate current version user data blocks (MUs 170) and erase GCUs 154 during garbage collection operations.

An important aspect of entropy is that the variability should have little or no correlation to existing processes. For example, it would be inappropriate to use timing values or other inputs associated with the operation of a given user to provide entropy for that user. This is because the user has at least some control over the timing of the operations carried out on behalf of the user. Thus, collecting entropy based on the operation of a given user and using that to generate random numbers for use by that user is recursive and could potentially present a vulnerability to a side-channel attack.

Figure 10:
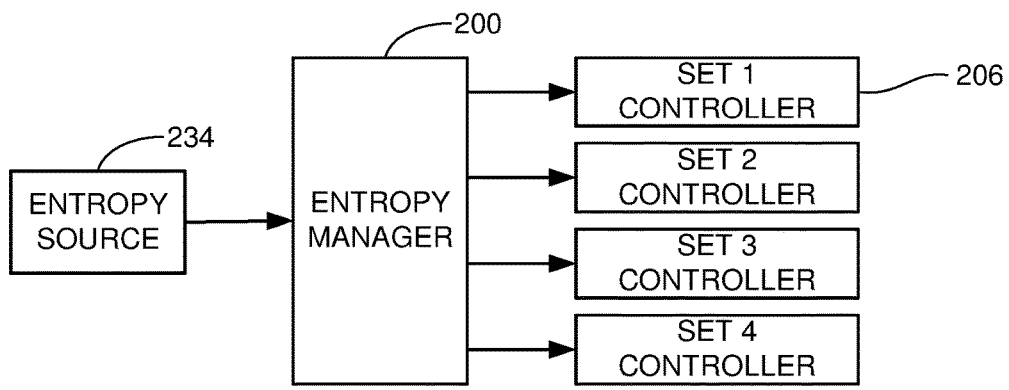
FIG. 10 depicts the interaction of the entropy manager circuit with individual set controllers.

Accordingly, as depicted in FIG. 10, the entropy manager circuit 200 operates to isolate the entropy supplied to each of the various set controllers 206 in such a way that the entropy from a given entropy source 234 is independent of the operation of the associated set controller. The entropy may be independent of a single set controller, or may be independent of all controllers.

Figure 11:
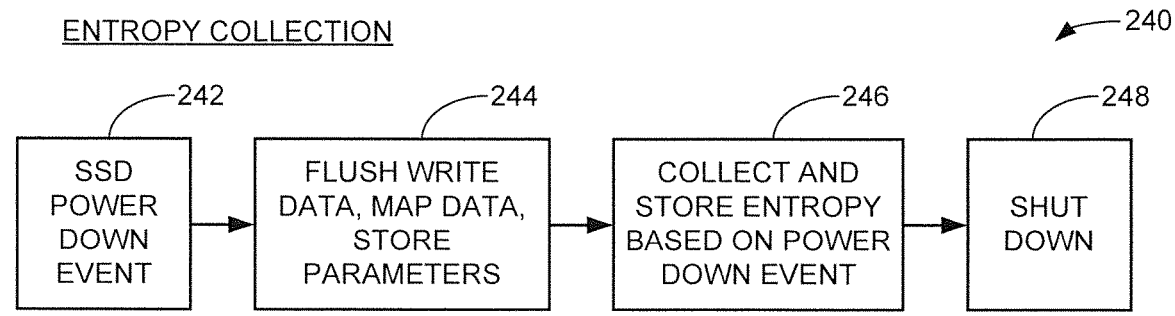
FIG. 11 illustrates an entropy collection sequence in some embodiments.

FIG. 11 shows a sequence diagram 240 for an entropy collection operation carried out by the entropy manager circuit 200 in some embodiments. A detected SSD power down event is initially detected at block 242. As noted above, this may arise from a detection signal supplied by the power management circuit 202 in FIG. 8.

Responsive to the power down indication, a scram operation is initiated by the SSD 110 to stop further normal operations and instead, prepare for the device to be transitioned to a deactivated state. Preparatory steps include completing all existing write commands, the flushing of any additional cached write data and state parameters to NVM (e.g., the flash memory 142), and the updating and storage of map data sets to the NVM.

During these operations, the entropy manager circuit 200 collects various entropy values and stores these to the NVM, as well. In one embodiment, the entropy manager circuit examines the state of the various hardware timers 204 (FIG. 8) at the time of receipt of the shutdown indication. The lower significant bits in the existing counter values can be collected as low entropy values for use by some or all of the set controllers.

In further embodiments, the entropy manager circuit may capture other entropy values, such as the contents of various RAID buffers 208 generated during the flushing of the user data, state parameters and map data during the scram operation. In this case, data associated with one set controller may be provided as an input entropy value for a different set controller. This is based on the fact that the respective die sets are independently operated by distinct users, so that the inputs from one user should have little or no correlation to the inputs from another user.

It follows that the entropy manager circuit may operate to collect both global entropy values that can be applied to all sets, as well as specific entropy values that can be applied to some sets but not others. Once all of the various data sets and other values have been safely stored to NVM, the SSD 110 enters a deactivated (shut down) condition, as indicated by block 248.

Figure 12:
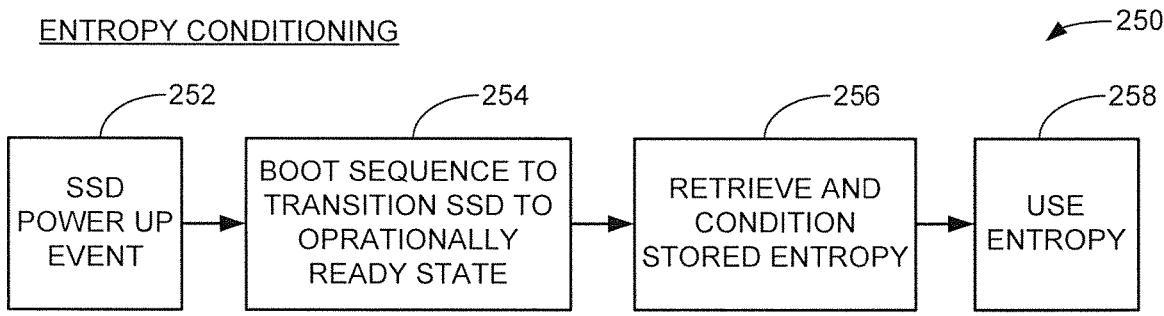
FIG. 12 illustrates an entropy conditioning sequence in further embodiments.

FIG. 12 shows a sequence diagram 250 for an entropy conditioning routine carried out during the reinitialization of the SSD 110. Due to energy budget and timing requirements, it is contemplated that the entropy collected during the shutdown sequence of FIG. 11 will be conditioned during the subsequent reinitialization of the SSD. However, this is not necessarily required, as at least some or all of the conditioning can take place prior to SSD deactivation as required.

At block 252, an SSD power up event is detected by the power management circuit 202. This may be from a specific activation signal, the resupply of source voltage on the external voltage lines, etc. Regardless, the SSD proceeds at block 254 to initiate a boot sequence to load firmware and various state parameters necessary to return the SSD to an operationally ready state.

As part of the initialization process, the entropy manager circuit 200 operates at block 256 to retrieve and condition the previously stored entropy, which is thereafter used during normal operation at block 258.

Figure 13:
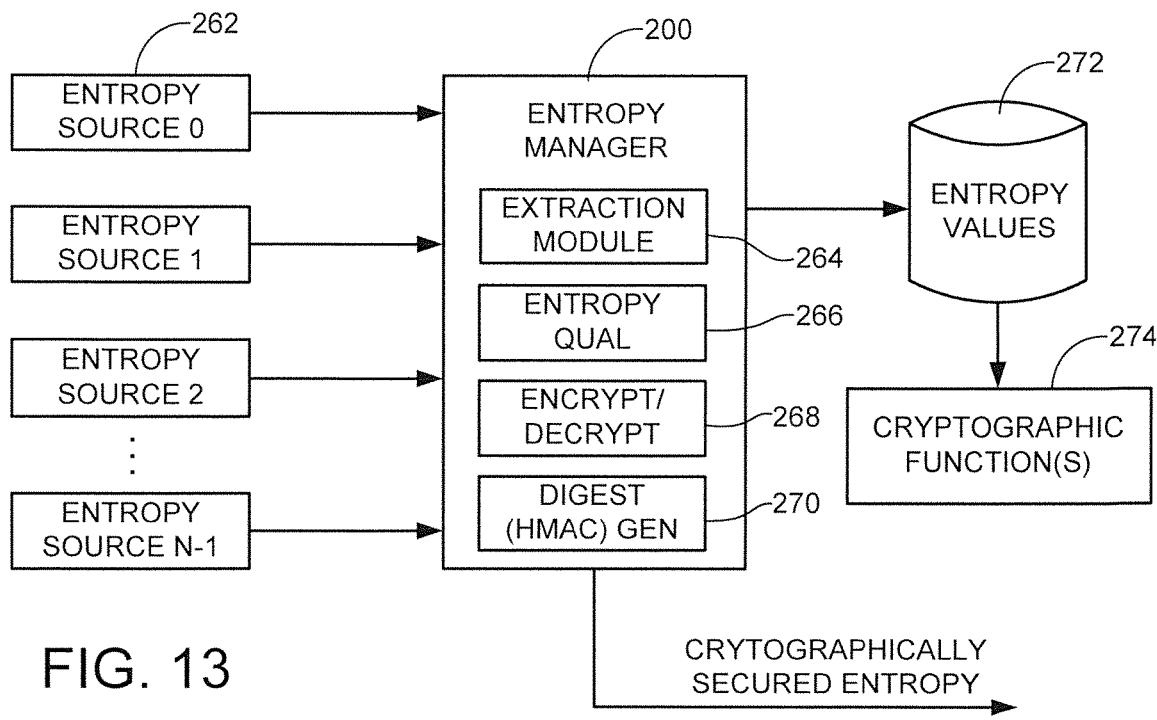
FIG. 13 shows the entropy manager circuit in greater detail in some embodiments.

The manner in which the entropy manager circuit 200 conditions the entropy can be carried out as shown by FIG. 13. FIG. 13 shows the entropy manager in conjunction with N available entropy sources 262. As noted above, these can vary as required and may include the hardware timers, buffers, etc.

The entropy manager circuit 200 includes a number of circuits (hardware or firmware based modules) including an extraction module 264, an entropy qualification module 266, an encryption/decryption module 268 and a digest (HMAC) generator module 270. Conditioned entropy generated by the circuit 200 may be temporarily stored in a memory 272 pending use by one or more cryptographic functions 274 (which in turn may correspond to function circuit 190 in FIG. 7). In some cases, the memory 272 may be volatile so that the entropy does not remain resident in the system upon a system shutdown or other reset event, but instead is more or less used on an on-demand basis. As will be appreciated, the present disclosure contemplates that it is generally inadvisable to maintain conditioned entropy in an easily accessible, unprotected form since an attacking party may use this as a vehicle to carry out side-channel attacks on the system.

The extraction module 264 includes an entropy extractor circuit adapted to extract entropy from one or more low entropy sources. The output bit sequences from the extractor are supplied as an input to the qualification module 266, which generates conditioned entropy therefrom. The module 266 can take any number of forms and can be designed to perform various statistical tests to generate the conditioned entropy with requisite levels of specified entropy and other factors.

The sources of the entropy (and the respective trust levels, as desired) can be taken into account by the qualification module 266. Implementations for the module 266 can include Galois/Counter Mode (CGM) processing, random number generation, application of universal or secure hash algorithm (SHA) hash functions, etc. In some cases, fixed sized blocks of conditioned entropy, such as 128 bit (32 byte) blocks, may be generated, and multiple blocks of such entropy will be successively passed to the memory 272. In some cases, the HMAC values can be used to detect tampering with the stored entropy values.

It is contemplated albeit not necessarily required that the blocks of entropy will be generated responsive to a scram event, since it is unpredictable when this will occur and the various entropy values (e.g., counts, buffer values, etc.) will not be predictable based on the internal processing. In some cases, the entropy manager circuit may randomly assign the extracted entropy for use by different ones of the set controllers 206, so that even if an attacker attempts to game the system by providing a deliberate shutdown, the encryption, conditioning and assignment of the entropy will not be traceable.

It will now be appreciated that the various embodiments presented herein provide a number of benefits. Conditioned entropy meeting the needs of a processing device can be cryptographically secured and stored for future use without making the stored entropy subject to discovery, tampering and/or attack. All of the entropy used by a given device can be cryptographically secured in this manner, or only that amount of entropy that is required for a standby supply. The entropy can be used for any suitable purpose including the generation of encryption keys, nonce values, seed values, hash inputs, etc.

While the various embodiments presented above have been directed to the environment of a data storage device, such is merely exemplary and is not limiting. Substantially any processing environment that utilizes entropy can benefit from the implementation of the various principles disclosed herein.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A computer implemented method comprising:
operating a processing device having a solid-state drive (SSD) to transfer data between a host device and a non-volatile memory (NVM);
detecting a power down event associated with the processing device;
collecting and storing, in a memory, entropy entirely correlated with only the power down event and not correlated to ongoing transfer of data between the host device and the NVM after detecting the power down event; and
subsequently using the collected and stored entropy after a subsequent reinitialization of the processing device as an input to a cryptographic function to subsequently transfer data between the host device and the NVM.

2. The method of claim 1, wherein the processing device is a data storage device comprising the NVM and a controller circuit.

3. The method of claim 1, wherein the entropy is collected from a hardware timer that generates a monotonically increasing count used to control a timing of the transfer of data between the host device and the NVM.

4. The method of claim 1, wherein the entropy is collected from a buffer used to generate a parity value for error detection and correction of read errors in a parity set of user data transferred to the NVM.

5. The method of claim 1, the processing device having a population of semiconductor memory dies divided into a plurality of die sets where each die set independently stores data from an associated user, wherein the entropy collected and stored in association with the power down event is associated with a first die set, and wherein the entropy collected and stored in association with the power down event is used as an input to a cryptographic function used to cryptographically protect data stored to a different, second die set.

6. The method of claim 5, wherein the entropy comprises a content of a RAID buffer used to generate a parity value during a flushing operation to flush data to the first die set.

7. The method of claim 1, further comprising conditioning the entropy by applying a cryptographic function thereto.

8. The method of claim 1, wherein the entropy is used to generate a random number.

9. The method of claim 1, further comprising detecting a subsequent power up event in which power is restored to the processing device, and applying a cryptographic function to qualify the entropy after the detection of the subsequent power up event.

10. A solid-state drive device, comprising:
a non-volatile memory (NVM) having different portions allocated to different respective users and arranged to store user data blocks from the different users;
a power management circuit configured to detect a power down event associated with the solid-state drive device;
an entropy manager circuit configured to collect entropy associated with a first allocated portion of the NVM corresponding to a first user and responsive to the power down event and to store the collected entropy in the NVM; and
a controller circuit configured to, responsive to a subsequent reinitialization of the data storage device to transition the data storage device to a normal mode of operation, use the entropy collected and stored by the entropy manager circuit to encrypt data subsequently stored to a different second allocated portion of the NVM corresponding to a different second user.

11. The apparatus of claim 10, wherein the entropy is collected from a hardware timer that generates a monotonically increasing count used to control a timing of the transfer of data between the host device and the NVM, and wherein the entropy manager circuit selects a portion of a set of lowest significant bits from the monotonically increasing count of the hardware timer at a time associated with receipt of an indication of the power down event.

12. The apparatus of claim 10, wherein the entropy manager circuit collects the entropy from a buffer used to generate a parity value for error detection and correction of read errors in a parity set of user data transferred to the NVM.

13. The apparatus of claim 10, wherein the data storage device is characterized as an SSD having a population of semiconductor memory dies divided into a plurality of die sets where each die set independently stores data from an associated user, wherein the entropy collected and stored in association with the power down event by the entropy manager circuit is associated with a first die set, and wherein the entropy collected and stored in association with the power down event is used as an input to a cryptographic function used to cryptographically protect data stored to a different, second die set.

14. The apparatus of claim 13, wherein the entropy associated with the first die set is a parity value generated in a RAID buffer to detect and correct errors in a parity data set of user data written across a plurality of the dies in the first die set.

15. The apparatus of claim 13, wherein the entropy associated with the first die is a parity value generated in a RAID buffer to detect and correct errors in a map data set that provides a flash transition layer to identify physical addresses of user data blocks stored to the first die set.

16. The apparatus of claim 10, wherein the entropy manager circuit is further configured to condition the entropy by applying a cryptographic function thereto to generate a set of conditioned entropy, and to store the set of conditioned entropy to the NVM.

17. The apparatus of claim 10, wherein the power management circuit is further configured to detect a subsequent power up event in which power is restored to the processing device, wherein the entropy manager circuit is further configured to apply a cryptographic function to qualify the entropy after the detection of the subsequent power up event, and wherein the control circuit uses the qualified entropy to encrypt data stored to the NVM.

18. A computer implemented method comprising:
operating a processing device to transfer data between a host device and a non-volatile memory (NVM);
detecting a power down event associated with the processing device;
collecting entropy associated with the power down event;
conditioning the entropy by applying a cryptographic function thereto;

storing, in a memory, the conditioned entropy;
subsequently using the collected, conditioned, and stored entropy after a subsequent reinitialization of the processing device as an input to a cryptographic function to subsequently transfer data between the host device and the NVM.

\* \* \* \* \*